United States Patent
Alonso-Miralles et al.

(10) Patent No.: US 9,630,702 B2
(45) Date of Patent: Apr. 25, 2017

(54) NOISE ATTENUATION FOR AN OPEN ROTOR AIRCRAFT PROPULSION SYSTEM

(71) Applicant: Rohr, Inc., Chula Vista, CA (US)

(72) Inventors: Jose S. Alonso-Miralles, Chula Vista, CA (US); Jia Yu, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 108 days.

(21) Appl. No.: 14/788,098

(22) Filed: Jun. 30, 2015

(65) Prior Publication Data

US 2017/0001708 A1    Jan. 5, 2017

(51) Int. Cl.
*B64C 1/40* (2006.01)
*B64C 23/00* (2006.01)
*B64D 27/14* (2006.01)
*B64D 27/26* (2006.01)
*B64D 27/00* (2006.01)

(52) U.S. Cl.
CPC ............... *B64C 1/40* (2013.01); *B64D 27/14* (2013.01); *B64D 27/26* (2013.01); *B64D 2027/005* (2013.01); *B64D 2027/262* (2013.01)

(58) Field of Classification Search
CPC ........................... B64C 1/40; B64D 2027/005
USPC .................................................. 244/1 N, 121
See application file for complete search history.

(56) References Cited

U.S. PATENT DOCUMENTS

| | | | | |
|---|---|---|---|---|
| 2,581,625 A | * | 1/1952 | Brady | B64C 11/00 244/119 |
| 2,929,586 A | * | 3/1960 | Hurd, Jr. | B64C 11/00 181/207 |
| 5,041,323 A | * | 8/1991 | Rose | B32B 3/12 181/292 |
| 7,971,684 B2 | * | 7/2011 | Gantie | F02C 7/24 181/284 |
| 8,371,105 B2 | | 2/2013 | Glynn et al. | |
| 8,678,314 B2 | * | 3/2014 | Martino Gonzalez | B64C 1/06 244/119 |
| 8,827,199 B2 | | 9/2014 | Aeberli et al. | |
| 2006/0145009 A1 | * | 7/2006 | Shockey | B32B 5/02 244/121 |
| 2009/0140096 A1 | * | 6/2009 | Verde Preckler | B64C 1/068 244/55 |
| 2009/0152400 A1 | * | 6/2009 | Verde Preckler | B64C 1/40 244/133 |
| 2010/0155526 A1 | * | 6/2010 | Negulescu | B64D 27/08 244/55 |
| 2011/0248117 A1 | * | 10/2011 | Boock | B32B 3/12 244/1 N |
| 2011/0259996 A1 | * | 10/2011 | Vetters | B64D 27/10 244/54 |
| 2012/0119023 A1 | * | 5/2012 | Moore | B64D 27/14 244/1 N |
| 2012/0195739 A1 | | 8/2012 | Kingan | |
| 2013/0009002 A1 | * | 1/2013 | Aeberli | B64D 33/06 244/1 N |
| 2014/0374566 A1 | * | 12/2014 | Fernando | B64C 21/10 248/554 |

* cited by examiner

*Primary Examiner* — Richard G Davis (74) *Attorney, Agent, or Firm* — O'Shea Getz P.C.

(57) ABSTRACT

An aircraft includes a fuselage, an aircraft propulsion system including an open rotor, and a pylon mounting the propulsion system to the fuselage. The fuselage includes an acoustic panel configured to attenuate noise generated by the open rotor.

14 Claims, 9 Drawing Sheets

NOISE ATTENUATION FOR AN OPEN ROTOR AIRCRAFT PROPULSION SYSTEM

BACKGROUND OF THE INVENTION

1. Technical Field

This disclosure relates generally to noise attenuation and, more particularly, to noise attenuation for an open rotor aircraft propulsion system.

2. Background Information

Open rotor propulsion systems are known to be configured with an aircraft such as a narrow or wide body commercial airplane. Such open rotor propulsion systems, particularly counter-rotating open rotor propulsion systems, may generate significant loud noise. In a typical turbofan propulsion system, such noise may be attenuated utilizing one or more acoustic panels configured with the propulsion system's nacelle structure. However, since an open rotor propulsion system does not include a nacelle or other shroud surrounding its open rotors, other means for noise attenuation are needed.

SUMMARY OF THE DISCLOSURE

According to an aspect of the present disclosure, an aircraft is provided which includes a fuselage and an aircraft propulsion system including an open rotor. The aircraft also includes a pylon mounting the propulsion system to the fuselage. The fuselage includes an acoustic panel configured to attenuate noise generated by the open rotor.

According to another aspect of the present disclosure, another aircraft is provided which includes a body, an aircraft propulsion system and a pylon mounting the propulsion system to the body. The aircraft propulsion system includes a gas turbine engine and counter-rotating open rotors arranged aft of the gas turbine engine. The body includes an acoustic panel configured to attenuate noise generated by the counter-rotating open rotors.

The body may be configured as a fuselage and/or a wing of the aircraft.

The open rotor may be a first open rotor configured to rotate in a first direction. The aircraft propulsion system may include a second open rotor configured to rotate in a second direction opposite the first direction. The acoustic panel may also be configured to attenuate noise generated by the second open rotor.

The aircraft propulsion system may include a gas turbine engine configured forward of the open rotor.

The aircraft propulsion system may include a gas turbine engine configured aft of the open rotor.

The acoustic panel may be positioned axially adjacent the open rotor relative to an axial centerline of the aircraft propulsion system.

The acoustic panel may include a porous core connected between a perforated exterior sheet and an interior sheet.

The exterior sheet may be configured to prevent penetration of a blade or a fragment of a blade ejected from the open rotor through the acoustic panel. In addition or alternatively, the interior sheet may be configured to prevent penetration of a blade or a fragment of a blade ejected from the open rotor through the acoustic panel.

A shield may be configured with the acoustic panel. The shield may be configured to prevent penetration of a blade or a fragment of a blade ejected from the open rotor through the shield.

The acoustic panel may extend forward of the open rotor. In addition or alternatively, the acoustic panel may extend aft of the open rotor.

The pylon may include a second acoustic panel configured to attenuate noise generated by the open rotor.

The fuselage may be configured discrete from a wing.

The fuselage may be configured as part of a wing.

The foregoing features and the operation of the invention will become more apparent in light of the following description and the accompanying drawings.

DETAILED DESCRIPTION OF THE INVENTION

Figure 1:
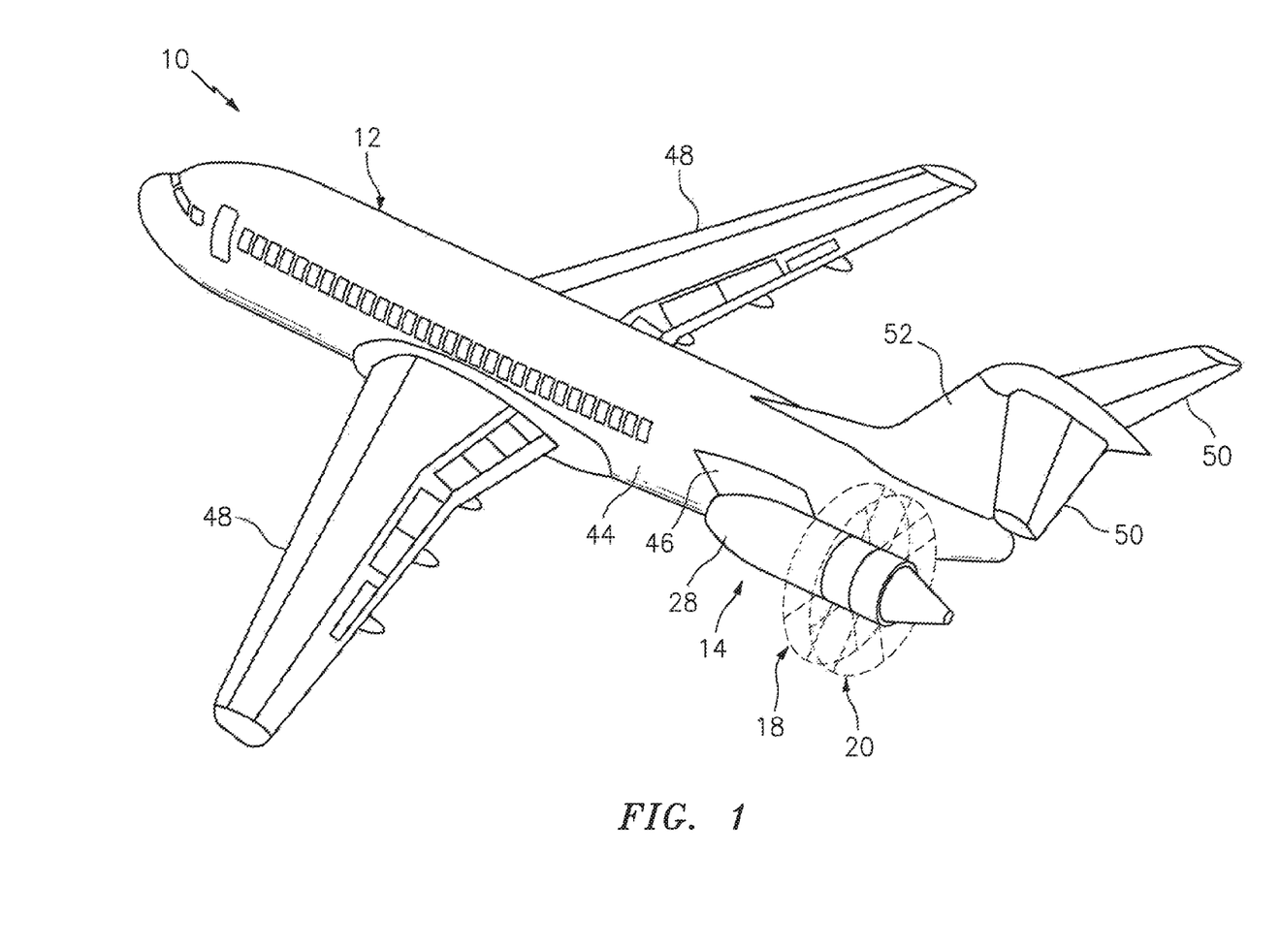
FIG. 1 is a perspective illustration of an aircraft with a plurality of open rotor aircraft propulsion systems.

FIG. 1 illustrates an aircraft 10. This aircraft 10 includes an airframe 12 and one or more aircraft propulsion systems 14, only one of which is shown.

Figure 2:
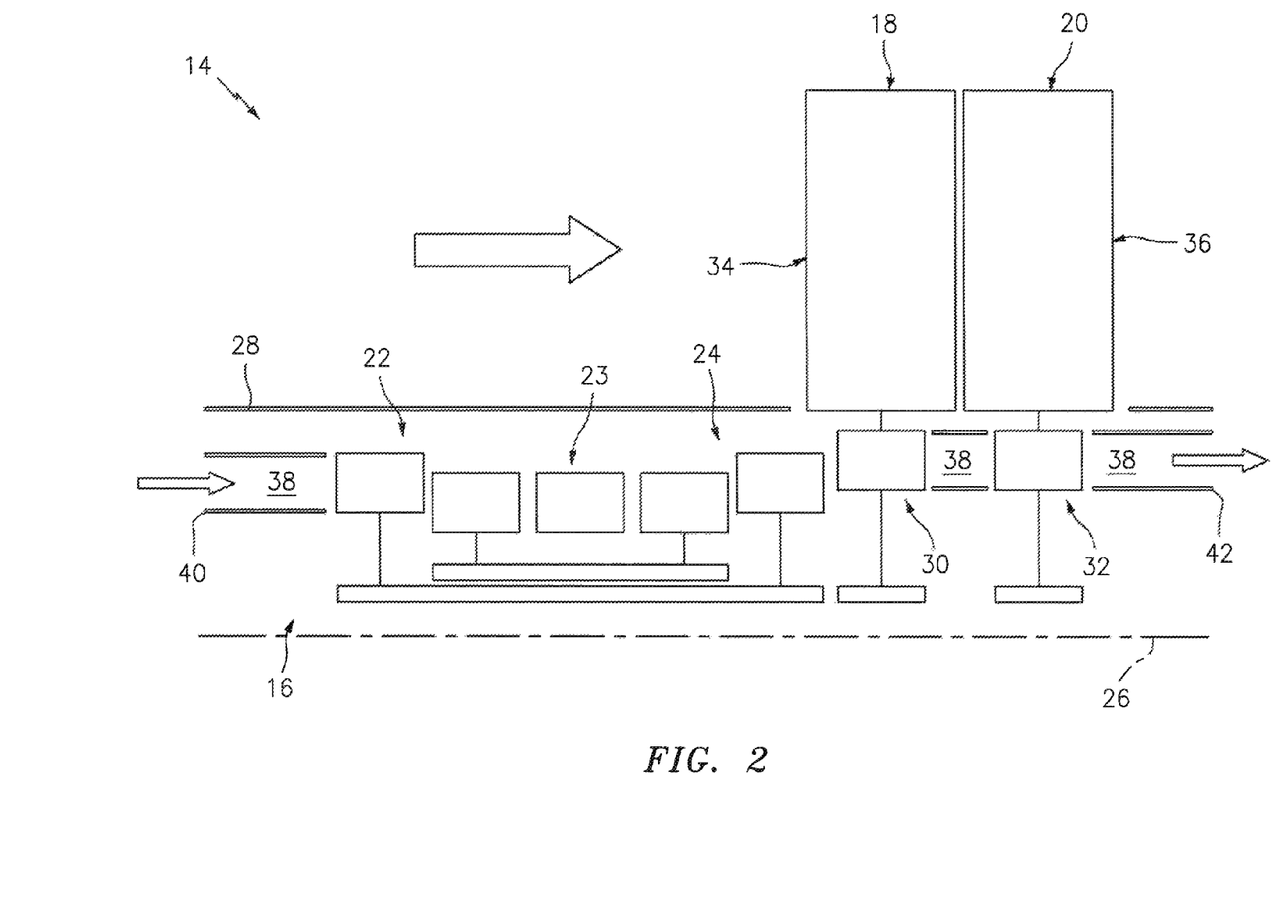
FIG. 2 is a half-view block diagram of an open rotor aircraft propulsion system.

Referring to FIG. 2, each of the propulsion systems 14 includes a gas turbine engine 16 and one or more open rotors 18 and 20. The gas turbine engine 16 includes a compressor section 22, a combustor section 23 and a turbine section 24. The engine sections 22-24 are arranged sequentially along an axial centerline 26 of the propulsion system 14 within an engine housing 28; e.g., a nacelle. The compressor section 22 includes a low pressure compressor (LPC) section and a high pressure compressor (HPC) section. The turbine section 24 includes a high pressure turbine (HPT) section and a low pressure turbine (LPT) section.

The open rotors 18 and 20 may be configured as counter-rotating open rotors. The first open rotor 18, for example, may be configured to rotate in a first direction. The second open rotor 20 may be configured to rotate in a second direction which is opposite the first direction. These rotors 18 and 24 are arranged aft and downstream of the gas turbine engine 16 as illustrated in FIG. 2. With such an arrangement, the propulsion system 14 is configured as a pusher propulsion system. However, the present disclosure is not limited to the foregoing exemplary embodiment. For example, in other embodiments, the open rotors 18 and 20 may be configured to rotate in a common direction. In addition or alternatively, the rotors 18 and 20 may be arranged forward and upstream of the gas turbine engine 16 to provide the propulsion system 14 with a tractor propulsion system configuration. Various other open rotor aircraft propulsion systems are known in the art and the application of the present invention is not limited to any particular ones thereof.

Referring again to the propulsion system 14 of FIG. 2, each of the open rotors 18 and 20 may be configured as a free rotor; e.g., discrete from other rotors in the gas turbine engine 16. Each of the open rotors 18 and 20 includes a turbine section 30, 32 and a propulsor section 34, 36. The turbine section 30, 32 is arranged in line with the engine sections 22-24. The turbine section 30, 32 is fluidly coupled with the engine sections 22-24 through a core gas path 38, which extends generally axially through the propulsion system 14 along the centerline 26 between an airflow inlet 40 and an exhaust nozzle 42. The propulsor section 34, 36 includes a plurality of rotor blades, which are arranged circumferentially about and connected to the turbine 30, 32. The rotor blades are disposed radially outboard of the engine housing 28.

The present disclosure, of course, is not limited to the foregoing exemplary open rotor configuration. For example, in alternative embodiments, the rotor blades of both propulsor sections 34 and 36 may be connected to a common turbine section. In such embodiments, the propulsor sections 34 and 36 may be configured for counter-rotation utilizing a gear train. By contrast, the turbine sections 30 and 32 of FIG. 2 may respectively include turbine blades with generally opposite pitches in order to cause the rotors 18 and 20 to counter-rotate.

During operation, air enters the propulsion system 14 through the airflow inlet 40. This air is directed into the core gas path 38, which extends sequentially through the engine sections 22-24, 30 and 32. This air within the core gas path 38 may be referred to as "core air".

The core air is compressed by rotors in the compressor section 22 and directed into a combustion chamber of a combustor in the combustor section 23. Fuel is injected into the combustion chamber and mixed with the compressed core air to provide a fuel-air mixture. This fuel air mixture is ignited and combustion products thereof (hereinafter "core gas") flow through and sequentially cause the rotors in the turbine sections 24, 30 and 32 to rotate. The rotation of the turbine section 24 rotors respectively drive rotation of the compressor section 22 rotors and, thus, compression of the air received from the core airflow inlet 40. The rotation of the turbine section 30 rotor drives rotation of the first open rotor 18 in the propulsor section 34, which propels air outside and adjacent the engine housing 28 in an aft direction. The rotation of the turbine section 32 rotor drives rotation of the second open rotor 20 in the propulsor section 36, which further propels the air outside and adjacent the engine housing 28 in the aft direction. The propulsion of the air by the open rotors 18 and 20 may account for a majority of thrust generated by the propulsion system 14, e.g., more than seventy-five percent (75%) of propulsion system 14 thrust. The propulsion system 14 of the present disclosure, however, is not limited to the foregoing exemplary thrust ratio.

Referring again to FIG. 1, each of the propulsion systems 14 is mounted to a body 44 of the airframe 12 by a pylon 46. In the specific embodiment of FIG. 1, the body is configured as a fuselage (hereinafter identified as "44") of the airframe 12. Of course, in alternative embodiments, the pylons 46 may mount one or more of the propulsion systems 14 to other bodies of the airframe 12 other than the fuselage 44.

The aircraft 10 of FIG. 1 includes the fuselage 44 and a plurality of wings 48 and 50. The wings include main or general lift wings 48 and stabilizer wings 50. The wings 48 are disposed on and connected to opposing sides of the fuselage 44. The wings 50 are disposed on and connected to opposing sides of a tail 52, which extends out from an aft portion of the fuselage 44. However, the present disclosure is not limited to any particular airframe types or configurations. For example, in the embodiment shown in FIG. 3, the fuselage 44 is configured as part of a wing 54 where, for example, the aircraft 10 is configured as a flying wing aircraft.

Figure 3:
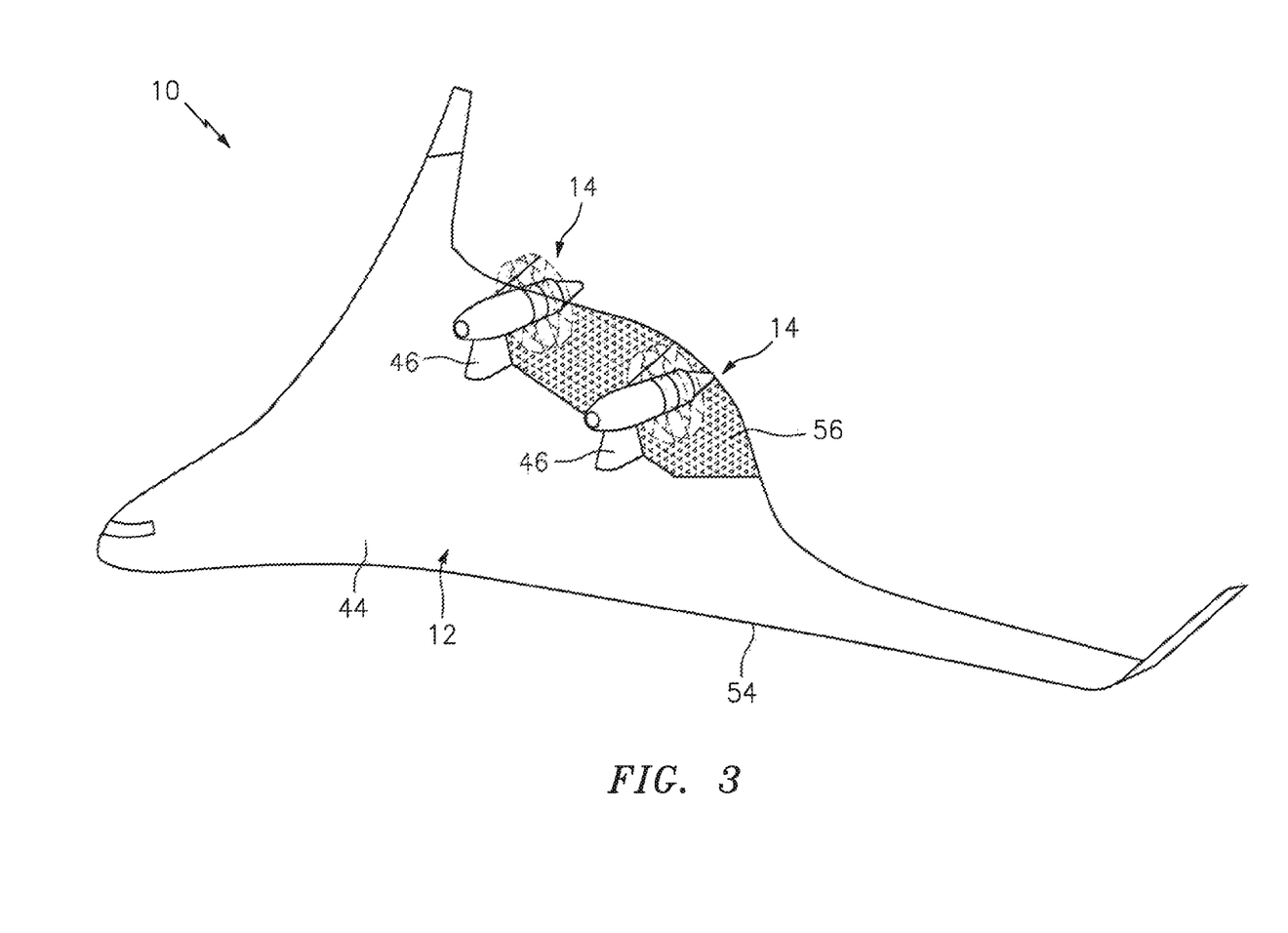
FIG. 3 is a perspective illustration of another aircraft with a plurality of open rotor aircraft propulsion systems.
Figure 4:
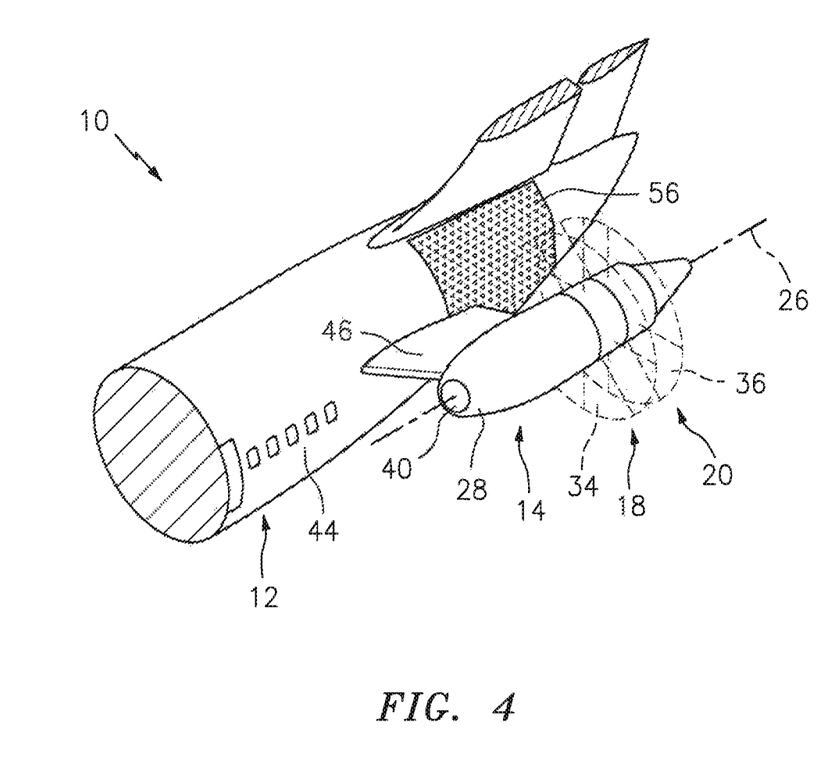
FIG. 4 is a perspective illustration of an aft portion of the aircraft of FIG. 1.
Figure 5:
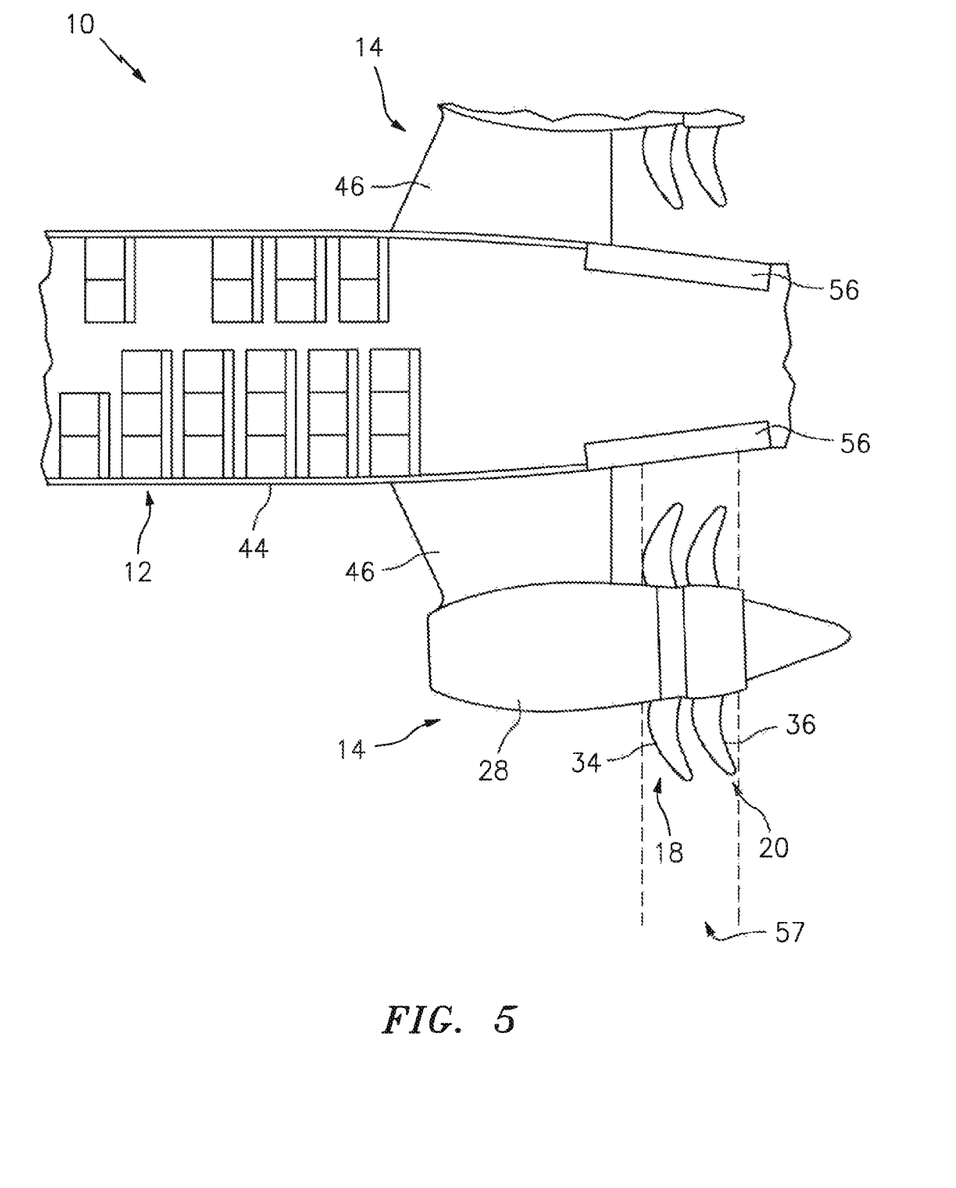
FIG. 5 is a partial cutaway illustration of another aft portion of the aircraft of FIG. 1.

Referring to FIGS. 3, 4 and 5, the fuselage 44 (e.g., the body to which the pylon(s) 46 are connected) includes at least one noise attenuating acoustic panel 56. This acoustic panel 56 is configured and arranged to attenuate noise generated by the open rotors 18 and 20 and, more particularly, noise generated by the propulsor sections 34 and 36. The acoustic panel 56 illustrated in FIGS. 3, 4 and 5, for example, is positioned generally axially adjacent the open rotors 18 and 20 relative to the centerline 26 of the respective propulsion system 14; e.g., in the rotor plane 57. The acoustic panel 56 may also extend axially forward and upstream of the open rotors 18 and 20; e.g., forward of the rotor plane 57. The acoustic panel 56 may also or alternatively extend axially aft and downstream of the open rotors 18 and 20; e.g., aft of the rotor plane 57.

Figure 6:
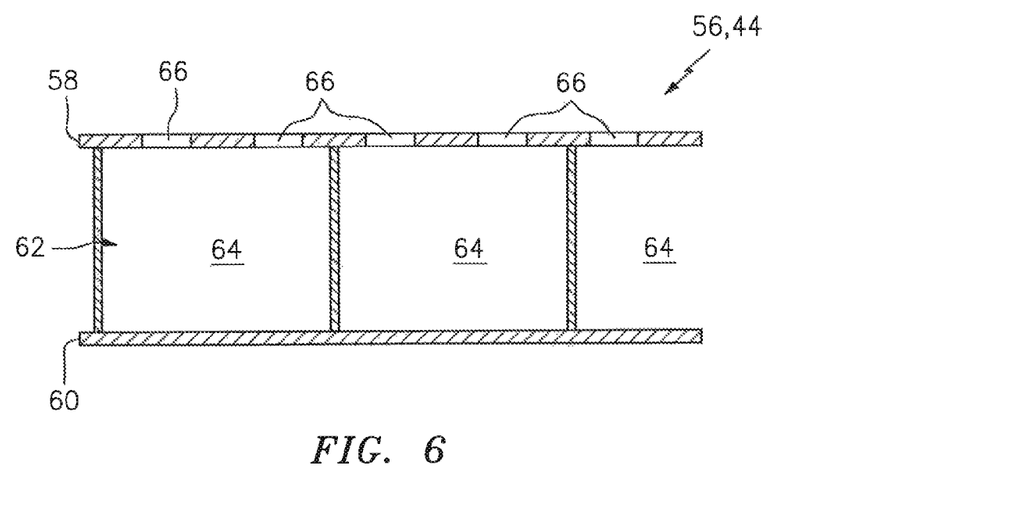
FIG. 6 is a partial sectional illustration of a single degree-of-freedom (SDoF) acoustic panel.
Figure 7:
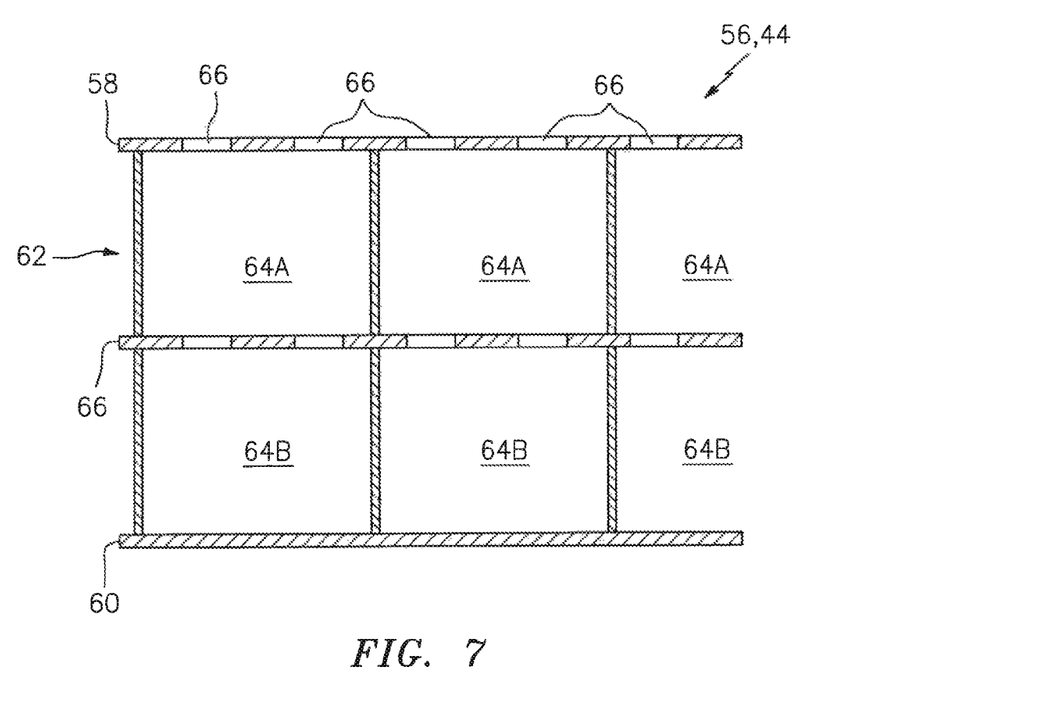
FIG. 7 is a partial sectional illustration of a double degree-of-freedom (DDoF) acoustic panel.

FIGS. 6 and 7 illustrate two exemplary types of noise attenuating acoustic panels 56. FIG. 6 illustrates a single degree-of-freedom (SDoF) acoustic panel. FIG. 7 illustrates a double degree-of-freedom (DDoF) acoustic panel. Each of these exemplary panels 56 may be constructed from any suitable material. Examples of suitable materials may include, but are not limited to, metals such as titanium, aluminum, etc. and/or composites such as fiberglass, carbon fiber, aramid (e.g., Kevlar) fiber within a polymer matrix. Of course, the present disclosure is not limited to the foregoing exemplary types of acoustic panels, nor the exemplary acoustic panel materials described above. More particularly, various other types of acoustic panel types and configurations (e.g., folding cavity acoustic panels, deep cavity acoustic panels, etc.) are known in the art, and the present disclosure is not limited to including any particular ones thereof.

In the exemplary embodiment of FIG. 6, the acoustic panel 56 includes a perforated exterior sheet 58, an interior sheet 60 and a porous core 62. The exterior sheet 58 may form a portion of an exterior skin of the fuselage 44. The interior sheet 60 is non-perforated. The porous core 62 may be configured as a honeycomb core. The porous core 62 is arranged and connected (e.g., bonded) between the exterior sheet 58 and the interior sheet 60. Cavities 64 (or pores) within the porous core 62 are fluidly coupled with perforations 66 in the exterior sheet 58. In this manner, the cavities 64 in the core 62 may operate similar to Helmholtz resonators and thereby attenuate noise (e.g., certain frequencies of sound waves) generated by the open rotors 18 and 20. The porous core 62 also stiffens the acoustic panel 56 and thereby can further stiffen the fuselage wall as compared to a single skin fuselage wall. By stiffening the fuselage wall, the porous core 62 and the acoustic panel 56 can reduce noise (e.g., propulsion system generated noise) transmitted through the wall into the cabin by providing a vibration and sound isolator structure.

In the exemplary embodiment of FIG. 7, the acoustic panel 56 has a similar configuration to that of the acoustic panel of FIG. 6, except the acoustic panel 56 of FIG. 7 also includes a perforated septum 66. This septum 66 is arranged with the acoustic panel 56 to divide the cavities of the core 62 into sub-cavities 64A and 6413. The septum 66 may be formed by a plurality of discrete elements respectively positioned within the cavities 64 and attached to the core 62, Alternatively, the septum 66 may be configured as a unitary sheet of perforated material arranged and bonded between two sub-cores which collectively form the core 62. The septum may be configured to provide an impedance of about 1.0 ρ*c, where ρ is density and c is speed of sound. Of course, the present disclosure is not limited to the foregoing exemplary DDoF acoustic panel configurations or impedances.

In some embodiments, one or more of the components of the acoustic panel 56 may be configured as a shield. More particularly, one or more of the components of the acoustic panel 56 may be configured to substantially prevent complete (or partial) penetration of a blade or blades and/or a fragment or fragments of a blade or blades ejected from one or more of the open rotors 18 and 20. For example, the exterior sheet 58, the interior sheet 60 and/or the septum 66 may be configured from a relatively thick panel of titanium, aluminum and/or other metal. The thickness of this panel may be sized to provide a relatively blade/blade fragment impenetrable shield. In another example, the exterior sheet 58, the interior sheet 60 and/or the septum 66 may be configured from a durable composite material such as, but not limited to, woven carbon fibers, woven aramid (e.g., Kevlar) fibers, etc. The composite material and the configuration of this material may be selected to provide a rigid body to thick metal sheet, or alternatively a compliant material which absorbs an impact of a blade or a blade fragment. Various other materials and material configurations are known in the art of turbine engine fan containment cases, which materials and configurations may substantially prevent (e.g., partial or complete) penetration of a blade or a blade fragment therethrough. The present disclosure, of course, is not limited to any particular types of materials or material configurations.

Figure 8:
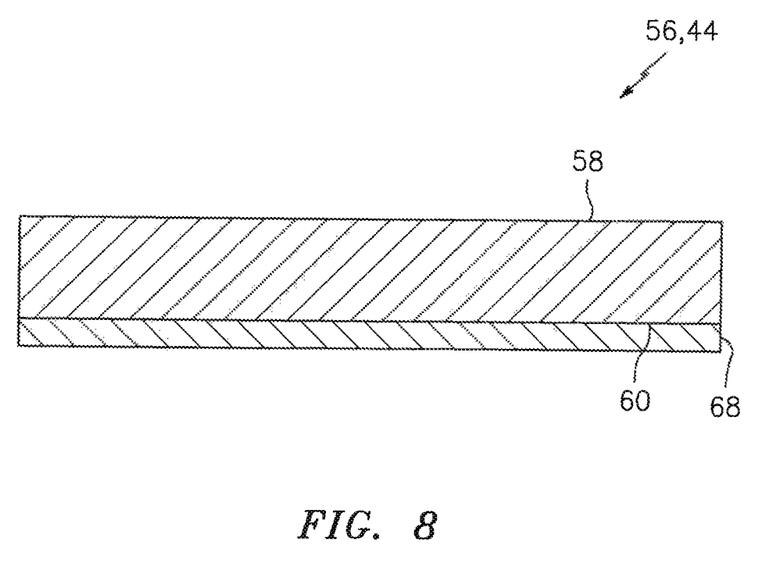
FIG. 8 is a partial sectional block diagram of an acoustic panel configured with a shield.

In some embodiments, referring to FIG. 8, a shield 68 may be configured with the acoustic panel 56. The shield 68, for example, may be disposed adjacent to and/or attached to the interior sheet 60 (e.g., back side) of the acoustic panel 56. This shield 68 may be configured, in a similar manner as described above, to substantially prevent complete (or partial) penetration of a blade or blades and/or a fragment or fragments of a blade or blades ejected from one or more of the open rotors 18 and 20.

Figures 9, 10:
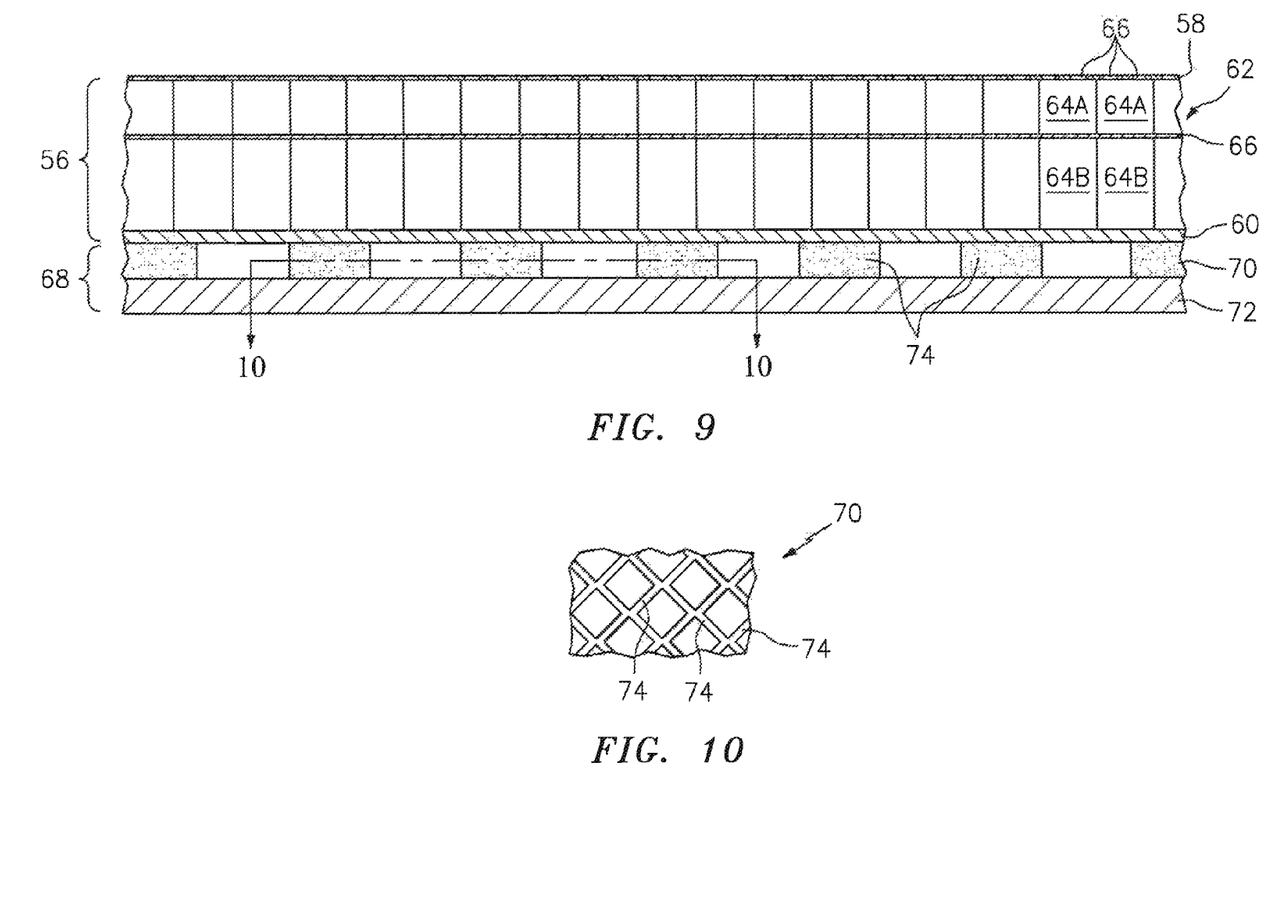
FIG. 9 is a partial sectional illustration of a double degree-of-freedom (DDoF) acoustic panel configured with a shield.
FIG. 10 is a partial cross-sectional illustration of a portion of the shield of FIG. 9.

FIG. 9 illustrates an exemplary embodiment of an acoustic panel 56 configured with a shield 68. Here, the acoustic panel 56 is illustrated as a double degree-of-freedom (DDoF) acoustic panel; however, this acoustic panel may alternatively have other configurations. The interior sheet 60 may be an acoustic solid back skin as described above. The interior sheet 60 may be constructed from metal, a composite such as carbon fiber, and/or various other materials. This interior sheet 60 may be a light weight back skin, and need not have impact resistance.

The shield 68 may include an elastic containment element 70 and a containment shell 72. The containment element 70 is positioned between the acoustic panel 56 and the containment shell 72; e.g., bonded and/or otherwise attached to one or more of the components 60 and 72. The containment element 70 may be configured as an isogrid elastic containment element with a plurality of interconnected reinforcement ribs 74 as shown, for example, in FIG. 10. This containment element 70 may be constructed from a material such as, but not limited to, woven aramid fibers (e.g., Kevlar). The containment element 70 is configured to provide an elastic absorbing system to reduce the impact energy of and reduce momentum of the blade(s) and/or blade fragment(s).

Referring again to FIG. 9, the containment shell 72 may be constructed from a sheet of impact resistance material. This containment shell 72 may provide a final barrier (e.g., substantially impenetrable barrier) between the impacting blade(s) and/or blade fragment(s) and an interior of the cabin.

Figure 11:
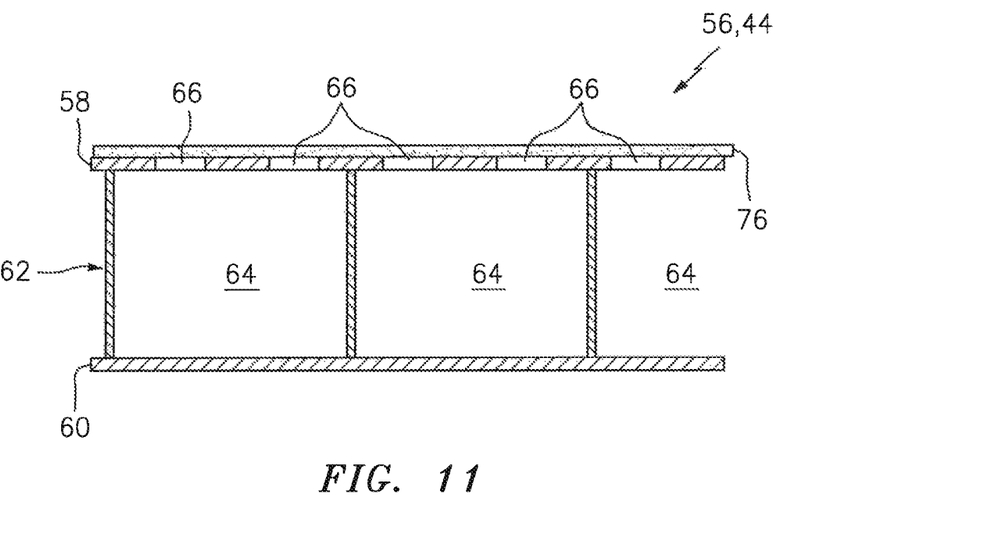
FIG. 11 is partial sectional illustration of another single degree-of-freedom (SDoF) acoustic panel configured with a low drag sheet.
Figure 12:
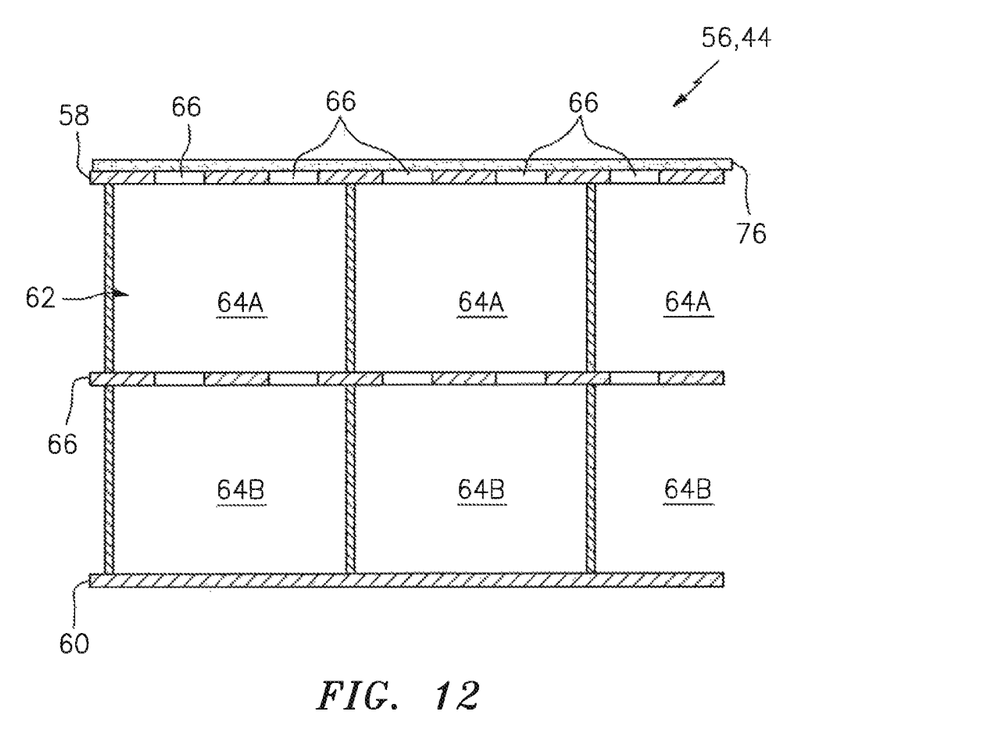
FIG. 12 is a partial sectional illustration of another double degree-of-freedom (DDoF) acoustic panel configured with a low drag sheet.

In some embodiments, the fuselage may also include a low drag sheet 76 attached to the exterior sheet 58; see FIGS. 11 and 12. This low drag sheet 76 may be attached to a top/exterior surface of the exterior sheet 58. The low drag sheet 76 may be a porous sheet of tightly knit mesh, or film with micro apertures. Such a sheet 76 will allow noise to permeate therethrough and into the acoustic panel, but provide the fuselage with a lower coefficient of drag than the porous exterior sheet 58.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An aircraft, comprising:
a fuselage;
an aircraft propulsion system including an open rotor; and
a pylon mounting the propulsion system to the fuselage;
wherein the fuselage includes an acoustic panel configured to attenuate noise generated by the open rotor, and the panel comprises a shield configured to prevent penetration of a blade or a fragment of a blade elected from the open rotor through the shield.

2. The aircraft of claim 1, wherein the open rotor is a first open rotor configured to rotate in a first direction, the aircraft propulsion system includes a second open rotor configured to rotate in a second direction opposite the first direction, and the acoustic panel is further configured to attenuate noise generated by the second open rotor.

3. The aircraft of claim 1, wherein the aircraft propulsion system includes a gas turbine engine configured forward of the open rotor.

4. The aircraft of claim 1, wherein the aircraft propulsion system includes a gas turbine engine configured aft of the open rotor.

5. The aircraft of claim 1, wherein the acoustic panel is positioned axially adjacent the open rotor relative to an axial centerline of the aircraft propulsion system.

6. The aircraft of claim 1, wherein the acoustic panel includes a porous core connected between a perforated exterior sheet and an interior sheet.

7. The aircraft of claim 1, wherein the acoustic panel extends forward of the open rotor.

8. The aircraft of claim 1, wherein the acoustic panel extends aft of the open rotor.

9. The aircraft of claim 1, wherein the pylon includes a second acoustic panel configured to attenuate noise generated by the open rotor.

10. The aircraft of claim 1, the fuselage is configured discrete from a wing.

11. The aircraft of claim 1, wherein the fuselage is configured as part of a wing.

12. An aircraft, comprising:
a fuselage;
an aircraft propulsion system including an open rotor; and
a pylon mounting the propulsion system to the fuselage;
wherein the fuselage includes an acoustic panel configured to attenuate noise generated by the open rotor;
wherein the acoustic panel includes a porous core connected between a perforated exterior sheet and an interior sheet; and
wherein the exterior sheet is configured to prevent penetration of a blade or a fragment of a blade ejected from the open rotor through the acoustic panel.

13. An aircraft, comprising:
a fuselage;
an aircraft propulsion system including an open rotor; and
a pylon mounting the propulsion system to the fuselage;
wherein the fuselage includes an acoustic panel configured to attenuate noise generated by the open rotor;
wherein the acoustic panel includes a porous core connected between a perforated exterior sheet and an interior sheet; and
wherein the interior sheet is configured to prevent penetration of a blade or a fragment of a blade ejected from the open rotor through the acoustic panel.

14. An aircraft, comprising:
a body;
an aircraft propulsion system including a gas turbine engine and counter-rotating open rotors arranged aft of the gas turbine engine; and
a pylon mounting the propulsion system to the body;
wherein the body includes an acoustic panel configured to attenuate noise generated by the counter-rotating open rotors, and the panel comprises a shield configured to prevent penetration of a blade or a fragment of a blade ejected from the open rotor through the shield.

* * * * *

UNITED STATES PATENT AND TRADEMARK OFFICE
CERTIFICATE OF CORRECTION

PATENT NO. : 9,630,702 B2  Page 1 of 1
APPLICATION NO. : 14/788098
DATED : April 25, 2017
INVENTOR(S) : Alonso-Miralles et al.

It is certified that error appears in the above-identified patent and that said Letters Patent is hereby corrected as shown below:

Column 5, Line 9, please delete "6413" and insert --64B--.

Column 6, Line 48, please delete "elected" and insert --ejected--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*